April 6, 1965 T. E. HOSKINS 3,177,285
BELL CAPS FOR UNDERFLOOR DUCT SYSTEMS
Filed May 21, 1962 2 Sheets-Sheet 1

INVENTOR.
Thomas E. Hoskins
BY
HIS ATTORNEYS

April 6, 1965   T. E. HOSKINS   3,177,285
BELL CAPS FOR UNDERFLOOR DUCT SYSTEMS
Filed May 21, 1962   2 Sheets-Sheet 2

INVENTOR.
Thomas E. Hoskins
BY
Webb, Mackey & Burden
HIS ATTORNEYS

United States Patent Office 3,177,285
Patented Apr. 6, 1965

3,177,285
BELL CAPS FOR UNDERFLOOR DUCT SYSTEMS
Thomas E. Hoskins, Moon Township, Allegheny County, Pa., assignor to Wheatland Electric Products Company, Carnegie, Pa.
Filed May 21, 1962, Ser. No. 196,158
8 Claims. (Cl. 174—48)

This application relates to a bell cap for flush floor fittings utilized in underfloor duct systems. More particularly, it relates to a segmented bell cap which enables removal of the bell cap from a cord without also removing a plug from the cord.

In underfloor duct systems, conduits are disposed below the surface of the floor and embedded in the concrete flooring. In such systems, it is the practice to provide service fittings at various positions throughout the floor. Various types of service fittings have been utilized; one such fitting is the flush floor fitting which enables a plug connection to be made substantially flush with the floor. When the fitting is not being utilized, it may be covered by a screw plug or closure plate. Since the fitting is substantially flush with the floor, the fitting, when covered by a closure plate will not be an obstruction.

When a flush floor fitting is in use, it is necessary to protect the plug from accidental damage due to being hit by a foot, a desk, or some other object. Furthermore, it is necessary to prevent water from reaching the plug, such as might occur when the floor is wet mopped. It is also desirable to cover the plug to prevent dust and dirt from falling into the fitting.

For these reasons, bell caps are utilized. Solid bell caps threaded into the flush floor fitting have been used to protect the plug and adjacent portion of the cord. These have had the defect that to put the bell cap on a cord, the plug must be removed and replaced after the bell cap is placed on or removed from the cord. The present extensive use of plugs molded on to the cord has aggravated that defect. To use a solid bell cap the plug must be cut from and a new plug installed on the end of the cord after the cord is inserted in a solid bell cap. This is both time consuming and expensive.

This invention provides a bell cap which protects the plug and fitting from water, dirt and physical damage, yet which can be readily removed from the cord without removing the plug from the cord. Essentially, it consists of a bell cap formed of a main section and a removable tongue insert through which the cord can pass to provide a means for insertion and removal of a cord from the bell cap. The edges of the main section have inwardly extending shoulders against which the tongue insert fits so that they mate to form a solid cap. When the cap is threaded to a flush floor fitting, the main section and the tongue are forced together with a gasket between them making a water tight joint.

In the drawings, the present preferred embodiment of the invention is shown, wherein.

Figure 2:
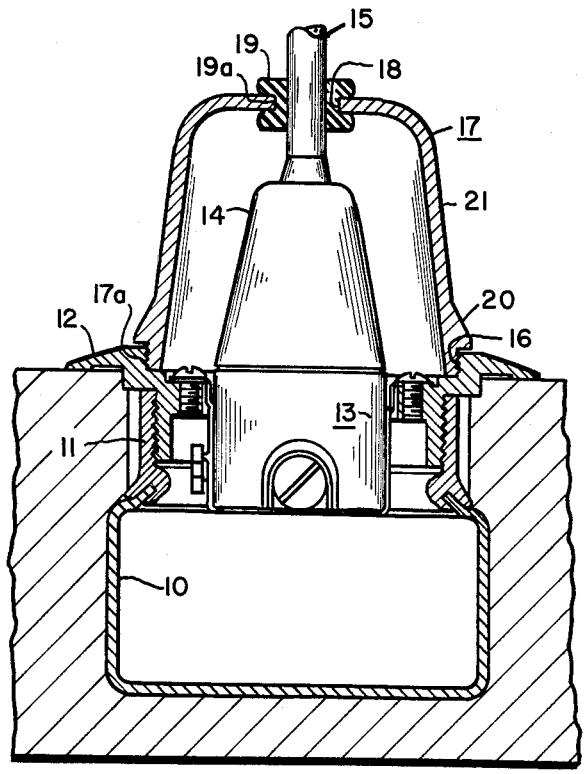
FIGURE 2 is a vertical longitudinal section through the floor fitting shown in FIGURE 1.
Figure 1:
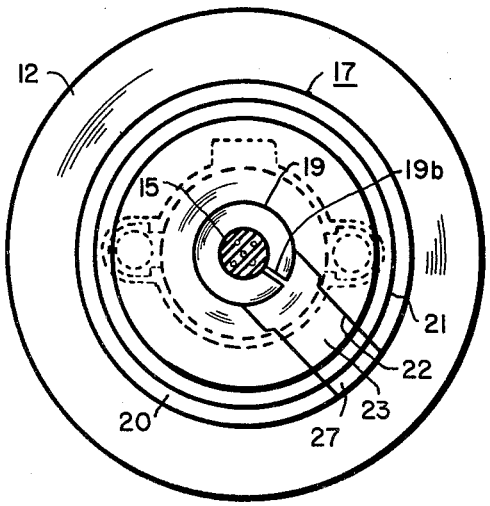
FIGURE 1 is a plan view of a flush floor fitting having my improved bell cap.

Referring to the drawings, FIGURES 1 and 2 show a floor fitting having my improved bell cap. An underfloor duct 10 imbedded in a concrete floor carries an outlet cup 11 which has been fitted to a circular opening in the top of the underfloor duct 10 as is described in my copending application Serial No. 127,737. The outlet cup 11 is interiorly threaded and a flange housing sleeve 12 is threaded into the outlet cup. The flange housing sleeve carries a receptacle 13 which in turn receives a plug 14 having an extension cord 15.

The flange housing sleeve has a circular opening 16 which is interiorly threaded and a bell cap 17 has threads 17a at its lower end which thread into the opening 16 in the flange housing sleeve.

The top of the bell cap 17 has a circular opening 18 through which the cord 15 passes. A grommet 19 having an outer peripheral groove 19a fits around the edges of the opening 18 and around the cord 15 and seals the opening 18.

The lower portion of the bell cap 17 has an outer flange 20 just above the threads 17a which extends around the bell cap and forms a sealing shoulder with the flange housing sleeve 12.

In order to place the bell cap 17 on the cord, as shown in FIGURE 2, but without removing the plug 14 from the cord, the bell cap 17 is made in two parts, a main section 21 which is a substantially complete bell cap but which has a longitudinally extending opening or slot 22 which extends from the opening 18 in the top of the main section through the base of the section and an insert 23 which is shaped to fit and close the longitudinal opening 22. When the bell cap is placed on the cord 15, the insert is removed from the opening and the cord is passed through the opening and into the ground 19 which for this purpose is split as shown at 19b in FIGURE 1. The upper edge of the insert 23 is fitted into the groove 19a of the grommet and the balance of the insert is placed in the opening 22. The main section of the bell cap with the insert in place in the opening 22 is then threaded into the circular opening 16 of the flange housing sleeve 12.

Figure 3:
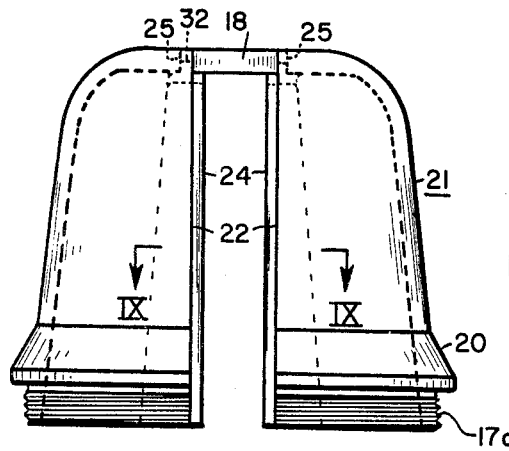
FIGURE 3 is an elevation view of the main section of my bell cap.
Figure 4:
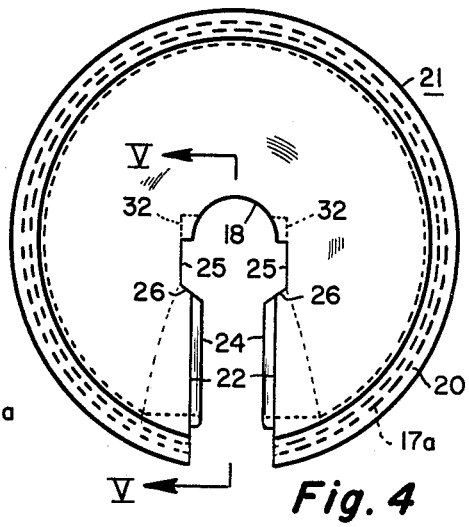
FIGURE 4 is a plan view of the section of FIGURE 3.
Figure 5:
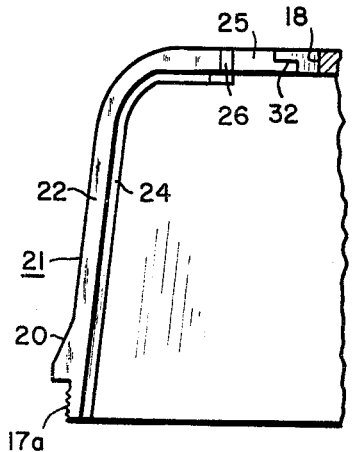
FIGURE 5 is a section along the lines V—V of FIGURE 4.
Figure 9:
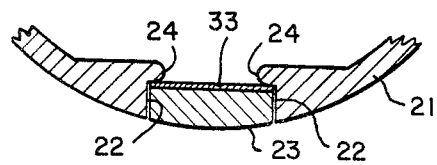
FIGURE 9 is a section along the lines IX—IX of FIGURE 3 with the insert of FIGURES 6 to 8 inclusive added to the main section shown in FIGURES 3 to 5 inclusive.

FIGURES 3 to 5 inclusive show the main section 21 of my bell cap. The main section is a substantially complete bell cap but it has a longitudinal opening or slot 22 which extends from the central opening 18 through the side of the section and through the base of the section. The edge portions of the opening 22 are thickened as shown in FIGURE 9 to form inwardly extending shoulders 24 which are spaced inwardly from the outer surface of the body portion of the main section a distance approximately equal to the thickness of the body of the main section.

As shown in FIGURE 4, the portion of the longitudinal opening 22 which is adjacent the central opening 18 is increased in width to form offset portions or notches 25 having diagonally extending shoulders 26.

Figures 6, 7:
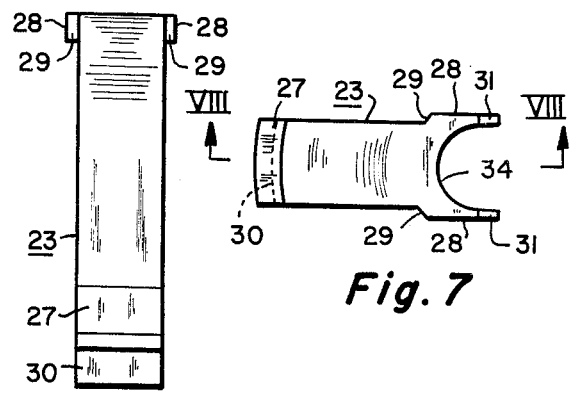
FIGURE 6 is an elevation of an insert which forms part of my bell cap.
FIGURE 7 is a plan view of the insert of FIGURE 6.
Figure 8:
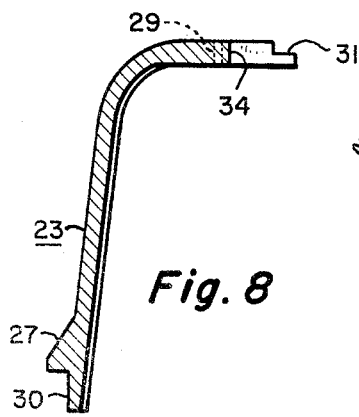
FIGURE 8 is a section along the lines VIII—VIII of FIGURE 7.

FIGURES 6 to 8 inclusive show the insert 23 which is placed in longitudinal opening 22 to close the opening and seal the main section 21 and thereby form a complete bell cap. The insert is a narrow strip of metal having the same thickness as the main section 21 and shaped to conform to the contour of the main section. At its lower end, it has an outer flange 27 which conforms to the outer flange 20 on the main section. At its upper end, the insert has laterally offset portions 28 on each side which fit within the offset portions 25 of the longitudinal opening 22. The offset portions 28 have shoulders 29 which abut against shoulders 26 formed by the offset portions 25 in the longitudinal opening when the insert is in place in the longitudinal opening, These shoulders 26 and 29 cooperate to hold the insert against outward movement at its top. The lower end 30 of the insert fits within the opening 16 in the flange housing sleeve 12 and thereby outward movement of the lower end of the insert is prevent.

The other end of the insert has a curved edge 34 corresponding to the curved edge in the main section and completing the circular opening 18 when the insert is in place. It also has two projections 31 which extend on either side of the top central opening 18 and which fit into recesses 32 formed in the lower surface of the main section 21 on opposite side of the central opening 18. These projections prevent the insert from being moved upwardly relative to the main section.

FIGURE 9 shows how the insert 23 fits within the opening 22 against the shoulders 24 which extend inwardly from the sides of the opening 22. To effect a complete seal of the bell cap, a gasket 33 is placed between the insert 23 and the shoulders 24.

From the foregoing, it is apparent that I have invented a bell cap which can be readily placed on and removed from a cord having a plug secured to its end and without removing the plug from the cord. The bell cap is installed by passing the cord through the longitudinal opening 22 into the central opening 18. The insert is placed in the longitudinal opening and in the grommet and the two parts are threaded into a flange housing sleeve. The bell cap is removed from the cord by threading it from the flange housing sleeve, removing the insert and pulling the cord through the longitudinal slot 22.

When the insert is placed in the longitudinal opening in the main section of the bell cap and the two parts are threaded into a flange housing sleeve, the bell cap fully protects the plug, cord and the receptacle.

While I have described a presently preferred embodiment of my invention, it is to be understood that it may be otherwise variously embodied within the scope of the appended claims.

I claim:

1. In a flush floor fitting for underfloor duct systems having openings in the upper wall of the duct, an outlet cup connected to said upper wall in alignment with each of said openings, a sleeve attached to said outlet cup having a receptacle therein, and a plug connected to the receptacle having a cord extending therefrom, an improved bell cap comprising:
(A) a main section, said section
  (1) being generally bell-shaped and having
    (a) a central opening in the top through which the cord passes,
    (b) a bottom mating with the top of said sleeve, and
    (c) a longitudinal slot extending from the periphery of said central opening in the top of the main section through the base of said section;
(B) an insert fitting into said slot and thereby close it; and
(C) a split grommet fitted around the periphery of the central opening in the top of the main section including the portion of said periphery interrupted by the end of said slot.

2. An improved bell cap as described in claim 1 in which the edges of said longitudinal slot in the top of said main section are laterally offset to increase the width of said slot and in which said insert has laterally offset portions to fit within and close the offsets in the slot.

3. An improved bell cap as described in claim 1 in which the edges of said longitudinal slot have inwardly extending shoulders and in which said insert abuts against the shoulders when in said slot.

4. An improved bell cap as described in claim 3 and in which there is a gasket between the shoulders and said insert.

5. An improved bell cap as described in claim 1 in which the upper end of said insert has projections which extend on opposite sides of the periphery of said central opening and beneath the surface of the top of said main section to prevent said insert from moving upwardly relative to said main section.

6. A bell cap for use with flush floor fittings of underfloor duct systems, said bell cap comprising:
(A) a bell-shaped main section having
  (1) a flat top portion formed with a central opening,
  (2) an annular downwardly diverging portion open at its bottom and having external threads adjacent said bottom adapted to cooperate with the threads on the sleeve of a floor fitting,
  (3) a slot extending from the periphery of said central opening through the threads to said bottom, and
  (4) outwardly offset notches formed in said top portion at the juncture of said slot and said opening;
(B) an insert having
  (1) a substantially horizontal extension located in the portion of said slot in said flat top portion, said horizontal extension having
    (a) a semi-circular cut-out portion cooperating with the periphery of said central opening to close said periphery where it is interrupted by said slot,
    (b) laterally offset portions positioned within the offset notches in said top, and
    (c) horizontal projections extending beneath and in contact with the lower surface of said top to prevent vertical displacement of said insert relative to said main section, and
  (2) a downwardly divergent extension integral with said horizontal extension and located in the portion of said slot in said downwardly diverging portion of said main section, said downwardly divergent extension terminating at the bottom of said main section and having
    (a) a lower end adjacent said external threads adapted to contact the sleeve of a floor fitting and prevent lateral movement of said insert relative to said main section.

7. A bell cap according to claim 6 in which the edges of said slot have inwardly extending shoulders which abut the inner edges of said insert to prevent inward movement of said insert relative to said main section; and a gasket positioned between said shoulders and said insert to form a water-tight seal between said insert and said main section.

8. A bell cap according to claim 6 having a split grommet positioned in said central opening with the split in said grommet facing said slot, whereby an electric appliance cord may be tightly fitted into said grommet through the split.

References Cited in the file of this patent

UNITED STATES PATENTS

| 230,290 | Lilly | July 20, 1880 |
| 2,240,050 | Nuebling | Apr. 29, 1941 |
| 2,291,430 | Ingersoll | July 28, 1942 |

FOREIGN PATENTS

| 314,268 | Great Britain | June 27, 1924 |

UNITED STATES PATENT OFFICE
CERTIFICATE OF CORRECTION

Patent No. 3,177,285                                               April 6, 1965

Thomas E. Hoskins

It is hereby certified that error appears in the above numbered patent requiring correction and that the said Letters Patent should read as corrected below.

Column 2, line 37, for "ground" read -- grommet --; line 47, for "centralo pening" read -- central opening --; same column 2, line 60, after "in" insert -- the --; column 3, line 6, for "prevent" read -- prevented --.

Signed and sealed this 24th day of August 1965.

(SEAL)
Attest:

ERNEST W. SWIDER                                       EDWARD J. BRENNER
Attesting Officer                                             Commissioner of Patents